United States Patent [19]

van der Lely et al.

[11] 4,185,477
[45] Jan. 29, 1980

[54] OVERLOAD COUPLINGS

[75] Inventors: Ary van der Lely, Maasland; Arie Kuipers, Brielle, both of Netherlands

[73] Assignee: C. van der Lely N. V., Maasland, Netherlands

[21] Appl. No.: 846,972

[22] Filed: Oct. 31, 1977

[30] Foreign Application Priority Data

Nov. 1, 1976 [NL] Netherlands ............. 7612079

[51] Int. Cl.² .................. F16D 3/56; F16D 7/00
[52] U.S. Cl. ........................... 64/28 R; 192/150
[58] Field of Search ............ 64/28 R; 192/150, 56 R

[56] References Cited

U.S. PATENT DOCUMENTS

| 373,784 | 11/1887 | Myers | 64/28 R |
|---|---|---|---|
| 535,744 | 3/1895 | Taylor | 64/28 R |
| 1,740,617 | 12/1929 | Morgan | 64/28 R |
| 1,740,838 | 12/1929 | Roesen | 64/28 R |
| 1,778,477 | 10/1930 | Wood | 64/28 R |
| 3,049,898 | 8/1962 | Voth | 64/28 R |

FOREIGN PATENT DOCUMENTS

| 866580 | 2/1953 | Fed. Rep. of Germany | 64/28 R |
|---|---|---|---|
| 1090975 | 2/1957 | Fed. Rep. of Germany | 64/28 R |
| 1140770 | 9/1961 | Fed. Rep. of Germany | 64/28 R |

Primary Examiner—Charles J. Myhre
Attorney, Agent, or Firm—Mason, Mason and Albright

[57] ABSTRACT

An overload coupling for two members, one rotating the other about a common axis, includes one or more frangible pin-like elements. Upon overload, the pin fractures and relative rotation between the members takes place. A spring or springs automatically urges one of the elements, mounted on one of the members, into engagement with an abutment on the other member to re-establish a rigid connection. The pin or pins can be in holders that extend radially or parallel to the common axis and each pin can be weakened in several areas and re-used. Also, a number of pins can be housed in a cassette that is connected to one coupling member by a release connection. Upon overload, in one embodiment, the spring or springs are mounted to urge the pin or pins only upon a reduction in the rotational speed of the coupling, when centrifugal force is overcome. The fragment broken off by the abutments in a channel for ejecting the fragment so that another pin or, at least an unbroken portion of the same pin, can re-establish connection as before.

48 Claims, 12 Drawing Figures

OVERLOAD COUPLINGS

According to a first aspect of the present invention there is provided an overload coupling comprising two coupling members which are rotatable about a common axis and at least one frangible element which is connected with one of the coupling members for movement in at least one direction relative to that member and which is disposed for engagement with at least one abutment of the other coupling member, whereby the frangible element, in normal operation, rigidly interconnects the coupling members for rotation together in at least one direction, fracture of the frangible element permitting relative rotation between the coupling members, advancement means being provided for advancing the remaining part of the frangible element, after such fracture, into re-engagement with the abutment or one of the abutments.

According to a second aspect of the present invention there is provided an overload coupling comprising two coupling members which are rotatable about a common axis and a plurality of elongate frangible elements each of which extends radially of the common axis and is connected with one of the coupling members for movement in at least one direction relative to that member, at least one abutment being provided on the other coupling member for engagement by one of the frangible elements, whereby at least one of the frangible elements, in normal operation, rigidly interconnects the coupling members for rotation together in at least one direction, fracture of the or all of the interconnecting frangible elements permitting rotation between the coupling members, advancement means being provided for advancing each frangible element, after such fracture, into re-engagement with the abutment or one of the abutments.

According to a third aspect of the present invention there is provided an overload coupling comprising two coupling members which are rotatable about a common axis and a plurality of frangible elements at least one of which, in normal operation, rigidly interconnects the coupling members for rotation together in at least one direction, at least two of the frangible elements being mounted side by side in a holder which is wholly or partly releasably mounted on one of the coupling members.

According to a fourth aspect of the present invention there is provided an overload coupling comprising a driving coupling member and a driven coupling member which are rotatable about a common axis, and at least one connecting element which, in normal operation, rigidly interconnects the coupling members for rotation in at least one direction, a control mechanism being provided which is adapted such that, upon release of the connecting element resulting from overloading of the coupling, the connecting element resumes the rigid interconnection between the coupling members during operation only when the speed of rotation of the driving coupling element is below a predetermined value.

According to a fifth aspect of the present invention there is provided a shaft having at least one universal joint and including at least one overload coupling comprising two coupling members which are rotatable about a common axis and at least one frangible element which is connected with one of the coupling members for movement in at least one direction relative to that member and which is disposed for engagement with at least one abutment of the other coupling member, whereby the frangible element, in normal operation, rigidly interconnects the coupling members for rotation together in at least one direction, fracture of the frangible element permitting relative rotation between the coupling members, advancement means being provided for advancing the frangible element, after such fracture, into re-engagement with the abutment or one of the abutments.

Embodiments of the present invention provide overload couplings which match the desired efficiency of the use of modern machinery and are particularly suitable for use in machine locations to which access is difficult for replacing a fractured frangible element, for example in large agricultural machines.

For a better understanding of the present invention and to show how it may be carried into effect, reference will now be made, by way of example only, to the accompanying drawings, in which.

Figures 1, 2:
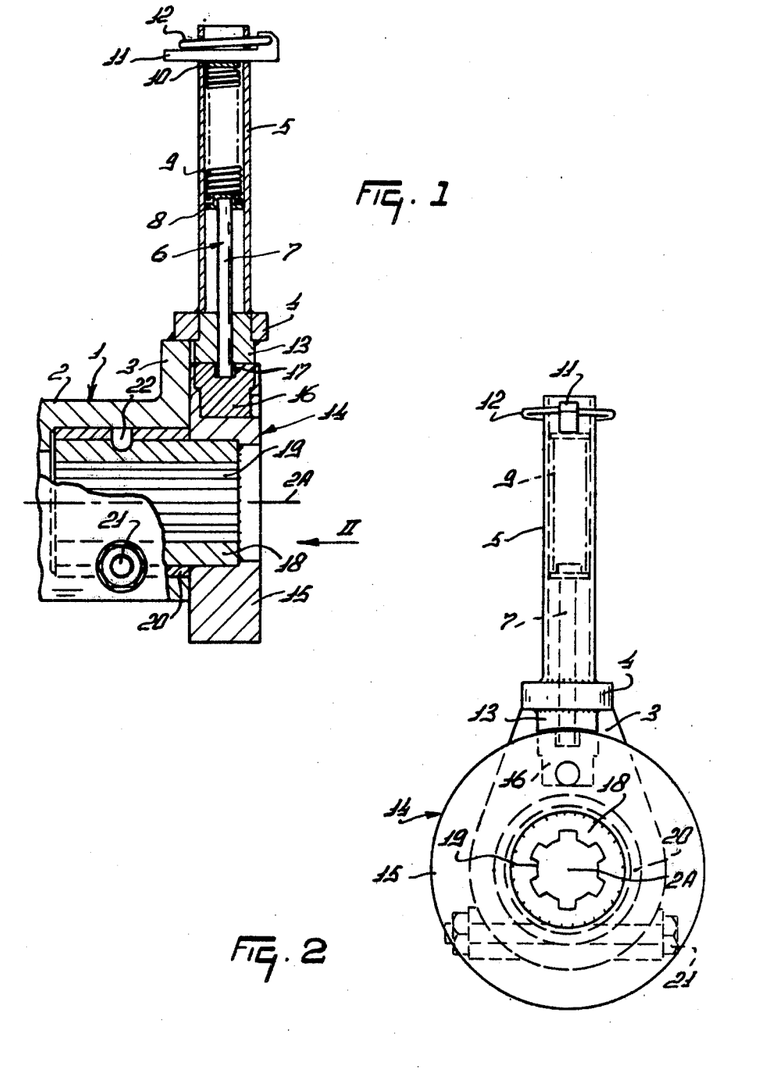
FIG. 1 is an elevational view partly in cross-section of a first embodiment of an overload coupling.
FIG. 2 is an elevational view taken in the direction of the arrow II in FIG. 1

The overload coupling shown in FIG. 1 comprises a coupling member 1, which is connected in this embodiment in a manner not shown with a driving shaft. The coupling member 1 comprises a hollow shaft 2 which is rigidly connected near one end to a coupling plate 3 extending for some distance in a radial direction. The plate 3 extends outwardly in the shape of a tag, as shown in the elevational view of FIG. 2, and near its end remote from the shaft 2 it has a width substantially corresponding to one third of the diameter of the shaft 2. To the end of the coupling plate 3 remote from the shaft 2 is welded a ring 4 extending axially of the shaft 2 away from the plate 3. The shaft 2 is rotatable about a rotary axis 2A. The face of the ring 4 remote from the rotary axis is provided with a connecting arrangement comprising a holder 5 containing a frangible connecting element 7. The holder 5 extends away from the ring 4 in a radial direction to the side away from the axis 2A. The holder 5 comprises a cylindrical sleeve. The frangible element 7 comprises a shear pin having a plurality of weakened, breakable zones. The outermost end of the shear pin 7 is received in an annular seat 8 having, at the side remote from the shear pin, an abutment surface for helical compression spring 9 extending from the seat 8 to near the outermost end of the holder 5. The outermost end of the spring 9 engages a circular plate 10, which abuts a guard pin 11 to restrain the spring in a radial direction. The guard pin 11 has a locking ring 12 so that the pin 11 can be fixed in place on the holder 5.

Inside the ring 4 is fitted a sleeve 13 which extends away from the holder 5 towards the rotary axis 2A and serves to absorb torque transferred by the shear pin 7. To this end, the sleeve 13 is in intimate engagement with the shear pin 8. The sleeve 13 may be made from hardened material.

The shear pin 7 normally connects the coupling member 1 with another coupling member 14. The coupling member 14 comprises a coupling plate 15 located coaxially with the rotary axis 2A and extending over some distance in an axial direction. It has near the rotary axis 2A a cylindrical cavity. The coupling plate 15 is provided with a sleeve 16 for receiving one end of the shear pin. The sleeve 16 is preferably made from hardened material and is arranged replaceably in the coupling plate 15. The sleeve 16 has an opening 17 for receiving the end of the shear pin, this opening being cylindrical in this embodiment and having a diameter slightly exceeding the diameter of the shear pin 7. The opening 17, which extends radially of the rotary axis 2A, may as an alternative be parallel to the surface of a cone having its vertex located on the side remote from the shear pin 7. The opening 17 extends radially for about one quarter of the radial length of the sleeve 16. The opening 17 is blind and its bottom is at the radially inner end for co-operation with the end of the shear pin 7. The coupling member 14 comprises a shaft portion 18 which is rigidly connected with the coupling plate 15 and is fastened in the cylindrical opening in the coupling plate 15. The shaft portion 18 extends inwardly from the coupling plate 15 for some distance towards the rotary axis 2A. The shaft portion 18, as shown in the elevational view of FIG. 2, is provided with serrations 19 for transferring a high torque to a shaft (not shown) coupled to the shaft portion 18. Inside the shaft 2 the shaft portion 18 is received in a sleeve 20, which is pressed into the shaft 2, the material of this sleeve 20 being appropriate to the intermittent function of the sleeve 20 as a sliding bearing for the shaft portion 18. The sleeve 20 and the shaft portion 18 are fixed against an axial displacement by a key formed by a bolt 21 which is held in place by a nut. The sleeve 20 and the shaft portion 18 have for this purpose corresponding annular openings 22 which are coaxial with the rotary axis 2A.

In operation the overload coupling shown in FIGS. 1 and 2 may be employed between two shaft portions or between a shaft and machine components, for example, components of an agricultural machine, for protecting the machine components and the shafts against overloading. For this purpose the shear pin 7 is adapted to transmit a predetermined maximum torque. If this maximum torque is exceeded, the portion of the shear pin 7 engaging the wall of the opening 17, which acts as an abutment, will break off. After this portion of the pin has broken off, the coupling members rotate about the rotary axis 2A relatively to each other although they are still axially fixed together by the belts 21. When the connection between the two coupling members is broken, the driving coupling member will continue to rotate, but the driven coupling member will very soon or after a short time come to a standstill in dependence upon the magnitude of the overload. Since the coupling member 1 continues to rotate, the holder 5 and the associated shear pin 7 also continue to rotate. As a result, centrifugal force will bias the shear pin outwardly against the pressure of the spring 9. The characteristic of the spring 9 is preferably adapted to the inertia of the shear pin. Owing to the balance between the centrifugal force acting on the mass of the shear pin 7 and the force of the spring 9, the shear pin 7 will be urged with only very slight pressure against the supporting surface formed by the radially outer wall of the plate 15 and towards the opening 17 during the continued rotation of the coupling member 1. Thus under these conditions the shear pin 7 is not capable of re-establishing the connection between the coupling members. The connection between the two coupling members will not be established until the speed of rotation of the coupling member 1 has been appreciably reduced by uncoupling the drive, when the spring 9 will act as advancement means for advancing the pin 7 into re-engagement with the opening 17. This can be achieved by matching the circumferential extent of the opening 17 to the diameter of the pin 7, the inertia force of the pin, and the characteristic of the spring 9. The circumferential extent of the opening 17 is a function of the factor T in the formula $S = \frac{1}{2}AT^2$, in which S is the distance to be covered by the pin towards the bottom of the opening 17 in order to re-establish a connection between the two coupling members. The factor A is a function of the force of the spring 9 and the mass of the pin 7.

In order to keep the factor A constant however many times the pin 7 has been fractured, the reduction of the spring force due to the radial inward shift of the pin 7 after fracture should be proportional to the reduced mass of the pin.

The circumferential extent of the opening 17 is preferably about twice the diameter of the shear pin. The speed at which the pin 7 re-establishes the connection is preferably chosen to be lower than the minimum possible self-sustaining speed of the driving engine. In this way the pin cannot prematurely re-establish the connection while the engine is still running at a speed reduced by the overload and while the drive is still in engagement.

It should be noted that since the opening 17 extends radially, the broken-off fragment of the shear pin 7 is automatically thrown out of the opening 17, and a further portion of the shear pin 7 automatically re-establishes the connection once the speed is reduced. The opening 17 thus acts as release means or as an ejector for the broken-off fragment. Since, after overload, the operator can re-establish the connection between the two coupling members only when he has intentionally reduced the driving speed by an appreciable amount, inadvertent continuous repeated fracture of the pin will be avoided.

Such a shear pin coupling is particularly advantageous in agricultural machines, especially between parts to which access is difficult or inconvenient or to which access is not possible at all during operation. When the shear pin, which preferably has at least five breakable portions and may advantageously comprise ten portions, has been completely used up by repeated overloads, it can be removed in a very simple manner. It is only necessary to remove the guard pin 11 and to slip a new shear pin 7 into the holder 5. The shear pin can break off so many times that it may be necessary to replace it only at normal periodical inspection or servincing of the machine.

Figures 3, 4, 5:
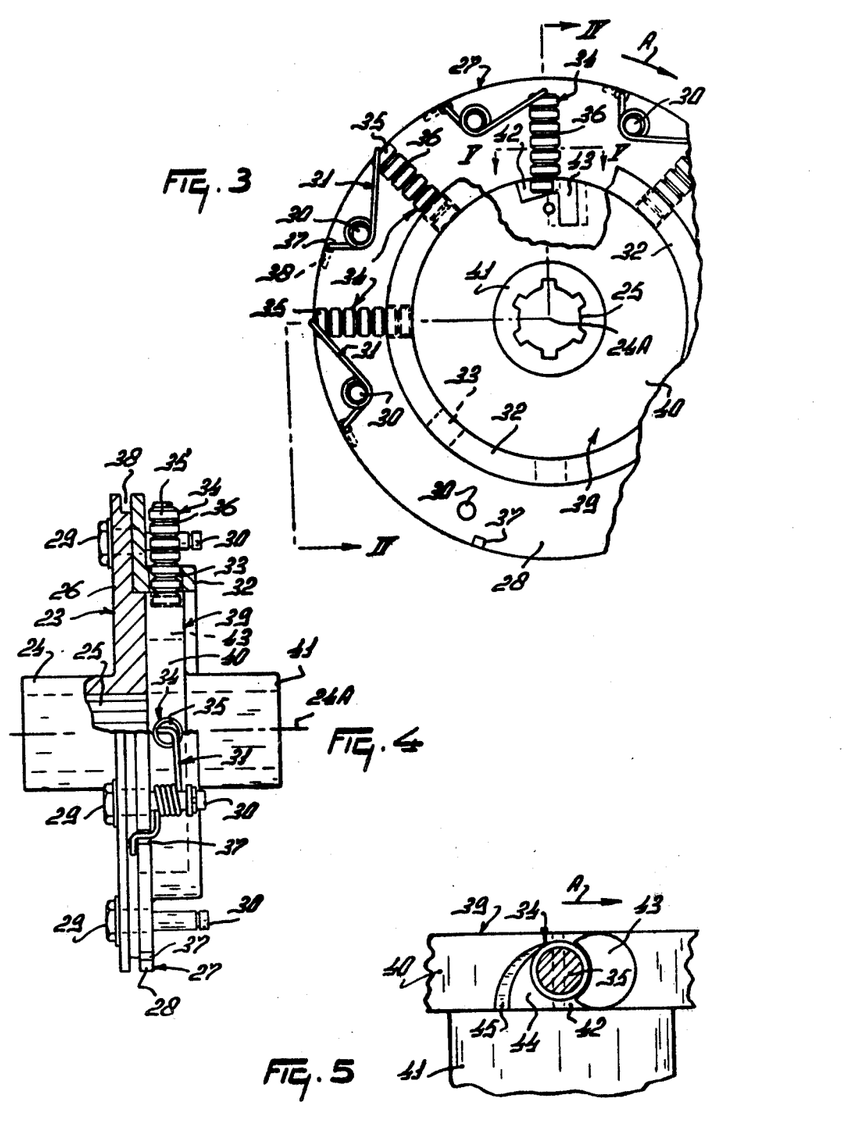
FIG. 3 is an elevational view of part of a second embodiment of an overload coupling.
FIG. 4 is a sectional view taken along the line IV—IV in FIG. 3.
FIG. 5 is a sectional view taken on the line V—V in FIG. 3.

FIGS. 3, 4 and 5 show a second embodiment of an overload coupling comprising a coupling member 23 formed by a hollow shaft portion 24 rotatable about a rotary axis 24A and having key ways 25 on its inner side for receiving a driving stub shaft (not shown). The shaft portion 24 is provided near one end with a coupling flange 26 which is coaxial with the shaft portion 24. The side of the plate 26 remote from the shaft portion is provided near the circumference with an annular supporting member 27, comprising a fastening portion 28 extending inwardly from the outer circumference of the coupling plate 26. The fastening portion 28 is fixed in place by means of equispaced bolts 29 near the circumference of the coupling plate 26. The fastening portion 28 has tapped holes for receiving the bolts 29. The free end of each bolt is not screw-threaded and forms a stub shaft 30 so that the bolts can serve in addition as a pivot pin for a torsion spring 31 looped over the shaft 30. The action of this spring 31 is comparable with that of the spring 9 of the preceding embodiment. The supporting member 27 furthermore comprises a supporting part 32 which is perpendicular to the portion 28 and which is coaxial with the rotary axis 24A. The supporting part 32 has radial recesses 33 for supporting and guiding shear pins 34 each having, in this embodiment, seven portion 35. The longitudinal centre lines of the pins 35 extend substantially radially. The shear pin portions 35 are separated one from another by locally weakened transitional zones 36. The tickness of the supporting part 32, in a radial direction, is preferably such that approximately two shear pin portions 35 are accommodated in the recess 33 at any one time. The diameter of the recess 33 is such that it closely surrounds the shear pin 34, but allows movement in a radial direction. Each torsion spring 31 has a free end which bears on the outermost end 35 of the respective shear pin 34. One limb of the spring bears on the shear pin 34, whereas the other limb, which is inclinded to the first limb, passes through an opening 37 in the fastening portion 28. A bent over part of this limb is received in an annular groove 38 in the side of the outer edge of the coupling flange 26 facing the supporting member 27 (FIG. 4). The spring 31, using the bolt end 30 as a fulcrum pushes the shear pin 24 towards the rotary axis 24A. The supporting member 27 is provided at equal intervals with eight similarly arranged shear pin 34. Seven of these pins are spare and only one is operative at any one time. The operative pin 34 connects the coupling member 23 with the associated coupling member 39. The coupling member 39 comprises a flange or coupling plate 40 and a shaft portion 41, whose center line coincides with the rotary axis 24A. The shaft portion 41 has internal key ways 25 for receiving a driven shaft (not shown).

It should be noted that the two coupling members 23 and 39 are restrained against relative axial displacement by guard means (not shown), as in the preceding embodiment. In order to allow thermal expansion, it is desirable to use guard means which allow a small axial displacement of the members.

The flange 40 has an opening 42 for receiving an end of the shear pin 34 interconnecting the coupling members. The opening 42 is bounded partly by supporting member constituted by a hard metal insert or disc 43 extending radially inwardly away from the circumference of the flange 40. The center line of the sleeve 43 is preferably parallel to the center line of the respective shear pin. The insert 43 has an abutment for the shear pin 36, constituted by a recess surrounding the opening 42 over an arc of about 100°. The opening 42, whose depth approximately corresponds to the height of one shear pin portion 35 and whose radially inner end is blind has furthermore an ejecting or release means formed by a channel 4 for thrusting the broken fragment of the shear pin from the opening. The channel 44 has a wall 45, which is curved. The wall subtends an angle of about 90° and extends, near the insert, parallel to the center line of the pin 36, whereas, away from the insert, it is at an angle to the center line. The wall extends to the side of the coupling member 39 remote from the coupling member 23.

During operation the coupling shown in FIGS. 3 to 5 establishes the connection between a driving part and a driven part of a shaft and/or machine part and it rotates in the direction of the arrow (FIG. 3). The operative shear pin 36 co-operating with the opening 42 is supported in the supporting member 27, which is made of hardened material either wholly or only partly in the region of the supporting part 32. The wall of the opening 42 is furthermore protected by the insert 43 of hard material against undesired deformation. In the event of overload the portion 35 located in the opening 42 will break off and this portion will snap from the opening into the channel 44 to be ejected in an axial direction owing to the specific shape of the wall 45. This direction of ejection may be advantageous when the coupling is used with its axis 24A extending upwards. As in the first embodiment, upon fracture of the portion 35 in the opening 42, the two coupling members will rotate relatively to one another, and, due to the overload, the coupling member 39 will come to a standstill either immediately or very quickly, whereas the coupling member 23 maintains the operational speed. The torsion spring 31 acting on the shear pins 34 have the same effect as described for the first embodiment. In this embodiment, owing to the use of a plurality of equispaced shear pins 34, the coupling as a whole is balanced. The coupling can be employed for a very long time without the need to replace the shear pins. The construction and disposition of the springs 31 means that the coupling can have a relatively small diameter. Once the speed of rotation of the coupling member 23 has been reduced, as in the first embodiment, the next-following portion, or a portion of one of the other pins, will re-establish the connection between the coupling members. Owing to the great number of shear pins the pins will be used at random, and the tendency will be for the shear pins to be grandually consumed together uniformly, without any one pin being used significantly more often than the others. It should be noted that the locally weakened transitional zones in the shear pins 34 may also be used in the shear pin 6 of the first embodiment.

Figures 6, 7, 8, 9:
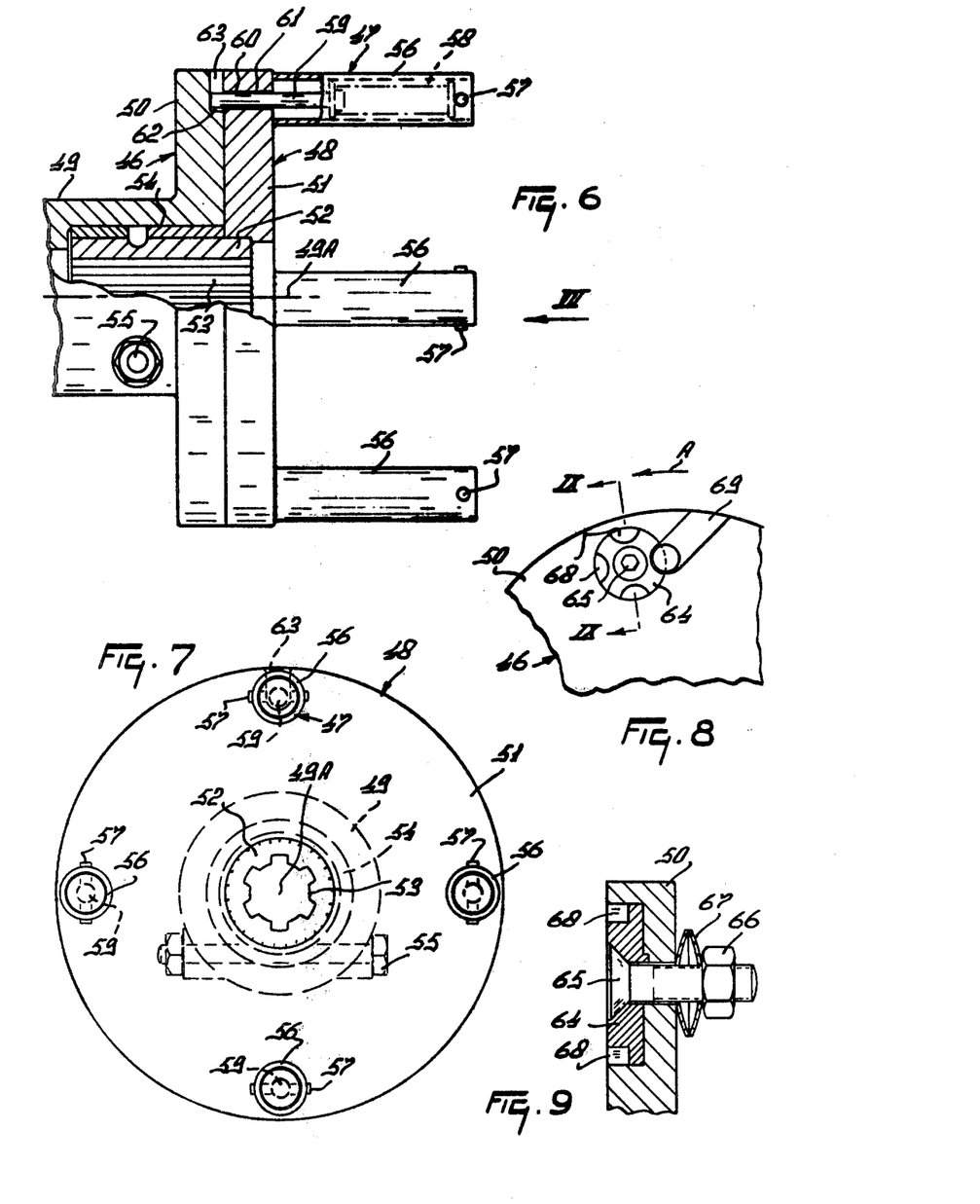
FIG. 6 is an elevational view partly in cross-section of a third embodiment of an overload coupling.
FIG. 7 is an elevational view taken in the direction of the arrow VII in FIG. 6.
FIG. 8 shows an alternative construction for part of the coupling of FIG. 6.
FIG. 9 is a sectional view taken on the line IX—IX in FIG. 8.

In the embodiment shown in FIGS. 6 and 7, a coupling member 46 is connected, in normal operation, by means of a shear pin arrangement 47 with a coupling member 48. The coupling member 46 comprises a shaft portion 49 connected with a radially extending coupling flange or plate 50. The axial end surface of the plate 50 remote from the shaft portion 49 engages a flange or plate 51 of the coupling member 48. The plate 51 is provided in the manner described with reference to FIGS. 1 and 2 with an inner shaft portion 52 intended to receive non-rotatably a shaft by means of axial key ways 53, while a key member is provided to prevent an axial movement of the two members, this key member being located in an annular opening in the shaft portion 52 and a surrounding sleeve 54, and being constituted by a bolt 55.

The shear pin arrangement 47 extends parallel to the rotary axis 49A of the coupling. The shear pin arrangement 47 is located in an axially extending holder 56 which is similar to the holder 5 of the FIG. 1 embodiment so as to form a housing for a retaining pin 57, a compression spring 58 and a shear pin 59. The shear pin 59 comprises locally weakened zones and is guided in a recess 60 in the plate 51, this recess bieng preferably provided in a sleeve 61 of hard material. The operative portion of the shear pin 59 is located in a blind opening 62 to limit the travel of the shear pin. This opening has ejecting or releasing means constituted by a channel 63 extending radially outwardly from the opening. The channel 63 may have a cylindrical or parallel-sided cross-section, but it may advantageously flare outwardly as illustrated. The opening 62 may be bounded at least partly by an insert of hardened material in a manner not shown. FIG. 7 shows that four equispaced shear pin arrangements 47 are provided. Three shear pins 59 are spare and only one is operative at any one time. However, perhaps when a higher torque is to be transmitted, it may be advantageous to have more shear pins in the operative state simultaneously.

In operation the coupling shown in FIGS. 6 and 7 constitutes an overload safety device as in the preceding embodiment. In the event of overload the portion of shear pin located in the opening 62 will break off and it will be effectively and reliably ejected immediately in a radial direction. After fracture one of the shear pins 59 can independently restore the connection between the two coupling members. Also this coupling can be used for a very long time without needing to fit new shear pins. With the axial disposition of the pins 59 the coupling has only a small diameter.

FIGS. 8 and 9 show an alternative form of opening and the associated ejecting means suitable for use in the construction shown in FIG. 6. An abutment member formed by a rotatable circular disc 64 is received in the coupling plate 50 and can be set in any one of a plurality of positions with the aid of a bolt 65 having a countersunk head, a nut 66 and a dished plate spring 67. The periphery of the disc 64 has semi-circular recesses 68 opening out on the outer side of the disc. Four recesses 68 are provided in the disc although other number of recesses could be provided. Depending on the of the disc and the size of the recesses 68 more recesses, for example, six may be provided. One of the recesses 68 opens into an ejecting channel 69 extending rearwardly and outwardly away from the disc 64 with respect to the direction of rotation A of the coupling. The longitudinal center line of this channel 69 is at an angle of about 50° to a radial line going through the recess 68. By turning of the disc, another recess 68 can be positioned to open into the channel 69. In this way the coupling member 46 is safeguarded against damage in the region near the opening 62 in the event of overload. The direction of the channel 69 with respect to the direction of rotation of the coupling is such that the release and ejection of the broken-off fragment of the shear pin 69 is satisfactorily carried out. In the event of damage of recess 68 a new recess 68 can be set and fixed by means of the nut 66 and bolt 65.

Figures 10, 12:
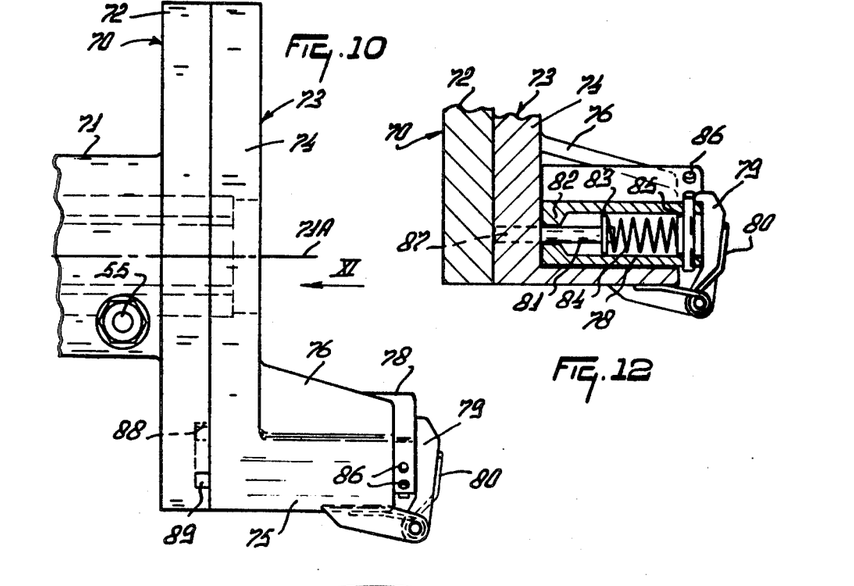
FIG. 10 is an elevational view of a fourth embodiment of an overload coupling.
FIG. 12 is a sectional view taken on the line XII—XII in FIG. 11.
Figure 11:
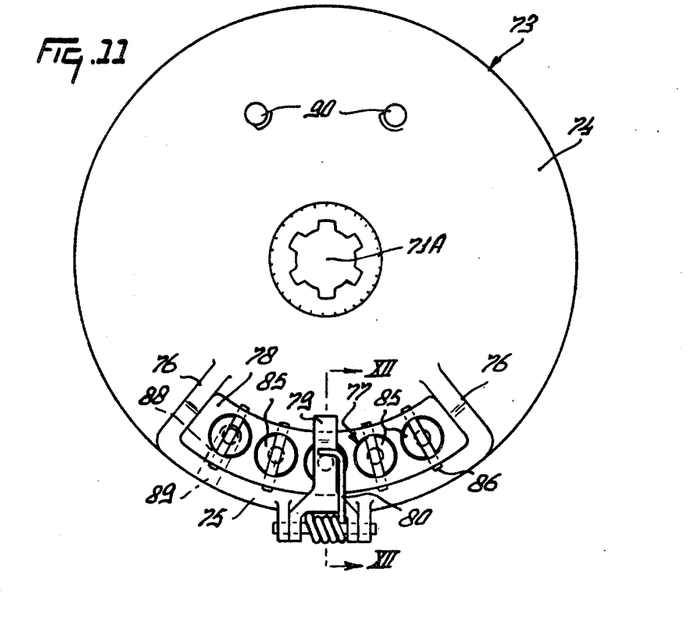
FIG. 11 is an elevational view taken in the direction of the arrow XI in FIG. 10.

FIGS. 10 to 12 show a fourth embodiment of an overload coupling. This coupling comprises, as in the preceding embodiments, a coupling member 70 (FIG. 10) formed by a hollow shaft portion 71 and a coupling plate or flange 72. The coupling furthermore comprises a coupling member 73 having a coupling plate 74. The coupling plate 74 extends radially of the rotary axis 71A of the coupling and is provided near part of its outer edge with a fastening part 75 extending axially for some distance away from the coupling member 70. Viewed in a direction parallel to the rotary axis 71A, this part 75 coincides at its outer circumference with part of the circumference of the coupling plate 74. In the embodiment shown the fastening part 75 subtends an angle of about 80° at the center of the plate 74. The fastening part 75 comprises furthermore two supporting parts 76 extending radially inwardly towards the rotary axis 71A. In the niche bounded by the supporting parts 76 and the fastening part 75 is secured a shear pin unit 77, which comprises an arcuate holder or cassette 78, which can be fastened to the fastening part 75 by means of a quick-release connector 79. The quick-release connector 79 comprises a torsion spring 80 operating to depress a retaining member. The holder 78 accommodates in the embodiment shown five shear pins 81 each extending parallel to the axis 71A. Each shear pin 81 is received in a hole of the holder and this hole has a narrow portion 82 adjacent the coupling member 73. This portion 82 serves as a stop for a shoulder 83 at the end of the shear pin 81 remote from the coupling member 73. The top side of the shoulder 83 is engaged by one end of a helical compression spring 84, the other end of which engages a ring 85 and a retaining pin 86. Each of the shear pins 81 passes into a respective aperture 87 serving as a passage. Near the lower end remote from the shoulder 83 one of the shear pins is located in an opening 88 similar to the opening 62 in FIG. 6. This opening 88 has an ejecting channel 89 extending radially outwardly from the opening 88. The coupling plate 74 has furthermore two tapped holes 90 for receiving fastening means of a balancing unit (not shown) for balancing the mass of the holder 78.

In operation the coupling shown in FIGS. 10 to 12 constitutes an overload safety unit as in the preceding embodiments. The shear pins are independently displaceable in the holder 78, while the holder with the springs 84 operates as advancement means or pressure means for the pins 81. The pins may each be composed of several breakable portions, but the breaking pins 81 may, as an alternative, each have only one breakable portion so that they can be fractured only once. In this case the pins 81 together form the breaking pin unit 77 which can re-establish the connection between the coupling members 70 and 73 several times. The construction in this embodiment has a great advantage in that the shear pins are located in a holder or casette 78, which can be readily replaced after fracture of the pins by a fresh holder, with new pins. In a preferred embodiment the coupling plate 74 is provided with two diametrically opposite cassettes so that the coupling is balanced. As an alternative, only one cassette may be used, in which case separate balancing weights may be provided. The cassette 78 may be used with great advantage in cases where it may be desirable to exchange the shear pins for ones of a different type to suit a different application.

It should be noted that structural details of the various described embodiments of the couplings may be combined; for example, the opening 42 and the associated ejecting channel 44 of FIG. 3 may be employed in the construction illustrated in FIGS. 10 to 12. This also applies to the use of hardened material around the whole or part of the opening with which the breaking pin portions are co-operating. It is furthermore possible to use balancing means of the kind used in the embodiment of FIGS. 10 to 12 also in the preceding embodiments.

It should be noted that the positions of the coupling members in these embodiments with respect to the driving shaft and the driven shaft may be inverted, i.e. drive may be transmitted in the opposite direction to that described.

While various features of the overload couplings that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. An overload coupling comprising two coupling members rotatable about a common axis, a first of said members having displaceable frangible means and the second member having abutment means, said frangible means normally engaging said abutment means to establish rotational movement of said members together in at least one direction of rotation, said frangible means being fracturable upon overload whereby one of said members is rotatable relative to the other member, advancement means cooperating with said frangible means and automatically urging the latter into re-engagement with said abutment means to re-establish normal rotational movement of both coupling members in common, said second coupling member comprising release means for releasing a fractured fragment of said frangible means from the abutment means, said release means comprising a channel that extends from said abutment means to the exterior of said coupling.

2. An overload coupling as claimed in claim 1, wherein said channel extends at least partly in a radial direction from said common axis.

3. An overload coupling as claimed in claim 2, wherein said channel has a substantially circular cross-section, at least in part.

4. An overload coupling as claimed in claim 3, wherein the longitudinal center line of said channel is at an angle of about 50° to the radial line passing through said abutment means.

5. An overload coupling as claimed in claim 3, wherein at least part of said channel is curved.

6. An overload coupling as claimed in claim 1, wherein a wall of the channel extends substantially parallel to the longitudinal center line of an elongated frangible element adjacent the abutment means and thereafter, at an acute angle to the longitudinal center line of said element.

7. An overload coupling as claimed in claim 1, wherein a wall of said channel is arcuate and subtends an angle of about 90° between the abutment means and the exterior.

8. An overload coupling as claimed in claim 1, wherein said abutment means comprises an arcuate wall portion of an opening in said second member.

9. An overload coupling as claimed in claim 8, wherein said opening is blind and the bottom thereof affords a limit for the advancement of said element after each fracture.

10. An overload coupling as claimed in claim 8, wherein said wall portion is constituted by part of the surface of an abutment member of hardened material.

11. An overload coupling as claimed in claim 10, wherein said abutment member only partly surrounds the opening.

12. An overload coupling as claimed in claim 4, wherein said abutment member has at least one recess which partly surrounds the opening.

13. An overload coupling as claimed in claim 12, wherein said abutment member comprises a disc which is adjustable to a plurality of positions with respect to said opening and in each of said positions, a respective recess in said disc partly surrounding the opening.

14. An overload coupling as claimed in claim 13, wherein said disc is rotatably connected to the said other coupling member.

15. An overload coupling as claimed in claim 1, wherein said frangible means is structured for multiple fracturing and can be advanced at least twice by said advancement means to re-engage said abutment means after successive fractures.

16. An overload coupling as claimed in claim 15, wherein said frangible means comprises a shear pin which is at least partly housed in an aperture of said one coupling.

17. An overload coupling as claimed in claim 1, wherein an elongated element of said frangible means extends parallel to said common rotary axis.

18. An overload coupling as claimed in claim 1, wherein said frangible means includes a plurality of elongated elements and said elements extend substantially radially with respect to said axis, said elements being displaceable radially by said advancement means, one of said elements establishing a rigid connection with an abutment of said abutment means until overload fracture, whereupon said members rotate relative to one another and said advancement means urges an unfractured part of said one element into engagement with said abutment, the fractured fragment escaping through said channel.

19. An overload coupling as claimed in claim 18, wherein said second member has at least one supporting surface adjoining said abutment, that prevents an undesirable displacement of said element in at least one direction.

20. An overload coupling as claimed in claim 19, wherein said surface extends coaxially with the rotary axis and comprises a wall portion of the second member, at least part of said wall portion being adjacent said first member.

21. An overload coupling as claimed in claim 19, wherein said surface is positioned to prevent undesirable displacement of a further element with respect to said first member during the relative rotation of said members.

22. An overload coupling as claimed in claim 18, wherein each element is displaceable more than three times by said advancement means to re-engage said abutment means after four successive fractures of that element.

23. An overload coupling as claimed in claim 18, wherein each element comprises a plurality of locally weakened zones and one weakened zone interconnecting the coupling members is located at the junction between said two coupling members.

24. An overload coupling as claimed in claim 1, wherein each element is positioned at least partly in a holder of said coupling.

25. An overload coupling as claimed in claim 24, wherein said holder is connected to said one coupling by fastening means.

26. An overload coupling as claimed in claim 24, wherein said holder comprises a housing that receives a plurality of frangible elements arranged side-by-side.

27. An overload coupling comprising two coupling members rotatable about a common axis, a first of said members supporting a plurality of frangible elements and at least one element rigidly interconnecting said members together for normal common rotational movement in at least one direction, said elements being mounted side-by-side on a holder and said elements together with said holder being connected to said coupling by releaseable connector means, a second of said members having abutment means and release means adjacent said abutment means for automatically releasing a broken fragment of said element from the abutment means, supporting parts on one of said members and said holder being fitted between said parts.

28. An overload coupling as claimed in claim 27, wherein said elements are each displaceable with respect to the holder, independently of one another.

29. An overload coupling as claimed in claim 28, wherein said holder mounts at least four frangible elements.

30. An overload coupling as claimed in claim 28, wherein each element has a shoulder that cooperates with a portion of said holder.

31. An overload coupling as claimed in claim 30, wherein a narrowed part of the holder engages the shoulder.

32. An overload coupling as claimed in claim 27, wherein said holder is arcuate and the center of the arc lies on said rotary axis.

33. An overload coupling as claimed in claim 27, wherein said holder is releasably connected to said one coupling member by a quick-release connector.

34. An overload coupling as claimed in claim 27, wherein said one coupling member supports two holders that are located diametrically opposite one another with respect to said rotary axis.

35. An overload coupling as claimed in claim 27, wherein said advancement means comprises a pressure device that bears on said one element after fracture thereof and during the relative rotation of said member, urges that element into re-engagement with said abutment.

36. An overload coupling as claimed in claim 35, wherein said pressure device is housed within said holder and comprises a ring that simultaneously urges all of said elements in the holder towards said second member.

37. An overload coupling comprising a driving coupling member and a driven coupling member rotatable about a common axis, a control mechanism comprising at least one displaceable frangible element that normally interconnects the two coupling members for rotation together in at least one direction, said element being fracturable upon overload, whereupon one of said members can rotate relative to the other member and re-establish a connection between the coupling members upon the driving member reaching a reduced speed of rotation that is below a predetermined value, release means for releasing automatically a broken off fragment of said element.

38. An overload coupling as claimed in claim 37, wherein advancement means comprising a spring bears on said element to displace same upon overload.

39. An overload coupling as claimed in claim 37, wherein a first of said members supports said frangible element and the second member comprises abutment means, said element normally engaging said abutment means to establish common rotational movement of said members together in at least one direction of rotation, said release means comprising a channel that extends from said abutment means to the exterior of the coupling.

40. An overload coupling as claimed in claim 39, wherein said release means comprises a channel that extends from said abutment means to the exterior of the coupling.

41. An overload coupling as claimed in claim 40, wherein said abutment means comprises an arcuate wall portion of an opening in said second member and said opening is blind, the bottom of said opening affording a limit for the advancement of said element after each fracture.

42. An overload coupling comprising a driving member and a driven member that are normally rigidly interconnected for rotation about a common axis by frangible element means comprising at least one element, one of the members mounting holder means and said element being slideably received in said holder means to engage abutment means in the other coupling member, said element being fractured upon overload whereupon said driving member is rotatable relative to said driven member, advancement means urging said element out of said holder means to automatically engage said abutment means and re-establish a rigid connection between the coupling means, said advancement means being operative during rotation of said coupling only at a rotational speed below a predetermined value, said driven member including release means for releasing a broken-off fragment of said element from the abutment means, said release means comprising a channel that extends from said abutment means to the exterior of the coupling.

43. An overload coupling as claimed in claim 42, wherein said advancement means is a spring that matches a counter centrifugal force and urges said element into engagement with said abutment means.

44. An overload coupling as claimed in claim 43, wherein said driving member comprises a flange and said driven member comprises a plate having at least one opening, the circumferential extent of the opening at least partly corresponding to the pressure exerted by said spring on said element upon fracture of the element.

45. An overload coupling as claimed in claim 44, wherein said element is an elongated pin and the circumferential extent of the opening is about twice the diameter of said pin.

46. A shaft having at least one universal joint and including at least one overload coupling comprising two coupling members rotatable about a common axis, at least one frangible element being connected to one of the coupling members for displaced movement in at least one direction relative to that member, said element normally engaging at least one abutment on the other coupling member to establish a frangible connection that rigidly interconnects the coupling members for rotation together in at least one direction, the fracture of said element permitting relative rotation between said coupling members and advancement means bearing on said element to urge the remainder of said element automatically into re-engagement with the abutment and again establish a frangible connection, said one coupling member including release means for releasing a broken-off fragment of said element from said abutment means, said release means comprising a channel that extends outwardly from said abutment means to the exterior of said coupling.

47. An overload coupling as claimed in claim 46, wherein said element is supported in holder means and the latter includes at least one elongated sleeve-like holder that is mounted on said driving member, said holder extending in a radial direction with respect to said axis.

48. An overload coupling as claimed in claim 46, wherein said element is supported in holder means and the latter includes at least one elongated sleeve-like holder that is mounted on said driven member, said holder extending substantially parallel to said axis.

* * * * *